United States Patent
Tsuchiya

(10) Patent No.: US 8,599,433 B2
(45) Date of Patent: Dec. 3, 2013

(54) IMAGE PROCESSOR, IMAGE PROCESSING METHOD, COMPUTER READABLE MEDIUM, AND IMAGE PROCESSING SYSTEM

(75) Inventor: Kentaro Tsuchiya, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 510 days.

(21) Appl. No.: 12/372,209

(22) Filed: Feb. 17, 2009

(65) Prior Publication Data

US 2010/0002247 A1   Jan. 7, 2010

(30) Foreign Application Priority Data

Jul. 3, 2008   (JP) .................................. 2008-174514

(51) Int. Cl.
*G06F 15/00* (2006.01)

(52) U.S. Cl.
USPC ............ 358/1.9; 358/1.13; 358/302; 715/745

(58) Field of Classification Search
None
See application file for complete search history.

(56) References Cited

U.S. PATENT DOCUMENTS

| | | | | |
|---|---|---|---|---|
| 6,662,270 B1 * | 12/2003 | Sans et al. | ...................... | 711/118 |
| 7,689,606 B2 * | 3/2010 | Burgoyne et al. | ............. | 707/643 |
| 7,940,409 B2 * | 5/2011 | Rajput | .......................... | 358/1.15 |
| 2002/0184485 A1 * | 12/2002 | Dray et al. | ..................... | 713/150 |
| 2005/0209929 A1 * | 9/2005 | Ehrich et al. | ..................... | 705/26 |
| 2005/0243372 A1 * | 11/2005 | Sato et al. | ..................... | 358/1.18 |
| 2007/0300162 A1 * | 12/2007 | Goto | ............................. | 715/745 |
| 2008/0062469 A1 * | 3/2008 | Silverbrook | .................. | 358/302 |
| 2008/0297812 A1 * | 12/2008 | Watanabe | ...................... | 358/1.9 |
| 2009/0198886 A1 * | 8/2009 | Balakrishnan | ................. | 711/114 |
| 2009/0319468 A1 * | 12/2009 | Miyata | .............................. | 707/1 |

FOREIGN PATENT DOCUMENTS

| | | |
|---|---|---|
| JP | 2006-289827 A | 10/2006 |
| JP | 2006-338569 A | 12/2006 |

* cited by examiner

*Primary Examiner* — Twyler Haskins
*Assistant Examiner* — Helen Q Zong
(74) *Attorney, Agent, or Firm* — Sughrue Mion, PLLC

(57) ABSTRACT

An image processor includes: a first storage; a rendering unit; a second storage; a creation unit; and a control unit that performs: a first control that makes the creation unit create sequentially variable images corresponding to respective records of variable data, and output the created variable images; and a second control that, in a case where variable image creating format data corresponding to format definition data conforming to the records embedded by the creation unit is not stored in the second storages makes the rendering unit render from the format definition data conforming to the records stored in the first storage to the variable image creating format data, and makes the creation unit output the variable image in which the recodes are embedded in the variable image creating format data rendered by the rendering unit separately from the output of the variable image by the first control.

10 Claims, 9 Drawing Sheets

IMAGE PROCESSOR, IMAGE PROCESSING METHOD, COMPUTER READABLE MEDIUM, AND IMAGE PROCESSING SYSTEM

CROSS-REFERENCE TO RELATED APPLICATIONS

This application is based on and claims priority under 35 U.S.C. 119 from Japanese Patent Application No. 2008-174514 filed Jul. 3, 2009.

BACKGROUND

1. Technical Field

The present invention relates to an image processor, an image processing method, a computer readable medium, and an image processing system.

SUMMARY

According to an aspect of the present invention, an image processor includes: a first storage that stores a plurality of format definition data for defining a format for a variable image created based on records constituting variable data; a rendering unit that renders from the format definition data to variable image creating format data; a second storage that stores the variable image creating format data rendered by the rendering unit; a creation unit that creates a variable image in which records are embedded in the variable image creating format data; and a control unit that performs: a first control that makes the creation unit create sequentially variable images corresponding to the respective records of the variable data, and output the created variable images; and a second control that, in a case where the variable image creating format data corresponding to the format definition data conforming to the records embedded by the creation unit is not stored in the second storage, makes the rendering unit render from the format definition data conforming to the records stored in the first storage to the variable image creating format data, and makes the creation unit output the variable image in which the recodes are embedded in the variable image creating format data rendered by the rendering unit separately from the output of the variable image by the first control.

BRIEF DESCRIPTION OF THE DRAWINGS

Exemplary embodiment of the present invention will be described in detail based on the following figures, wherein.

DETAILED DESCRIPTION (First Embodiment)

Figure 1:
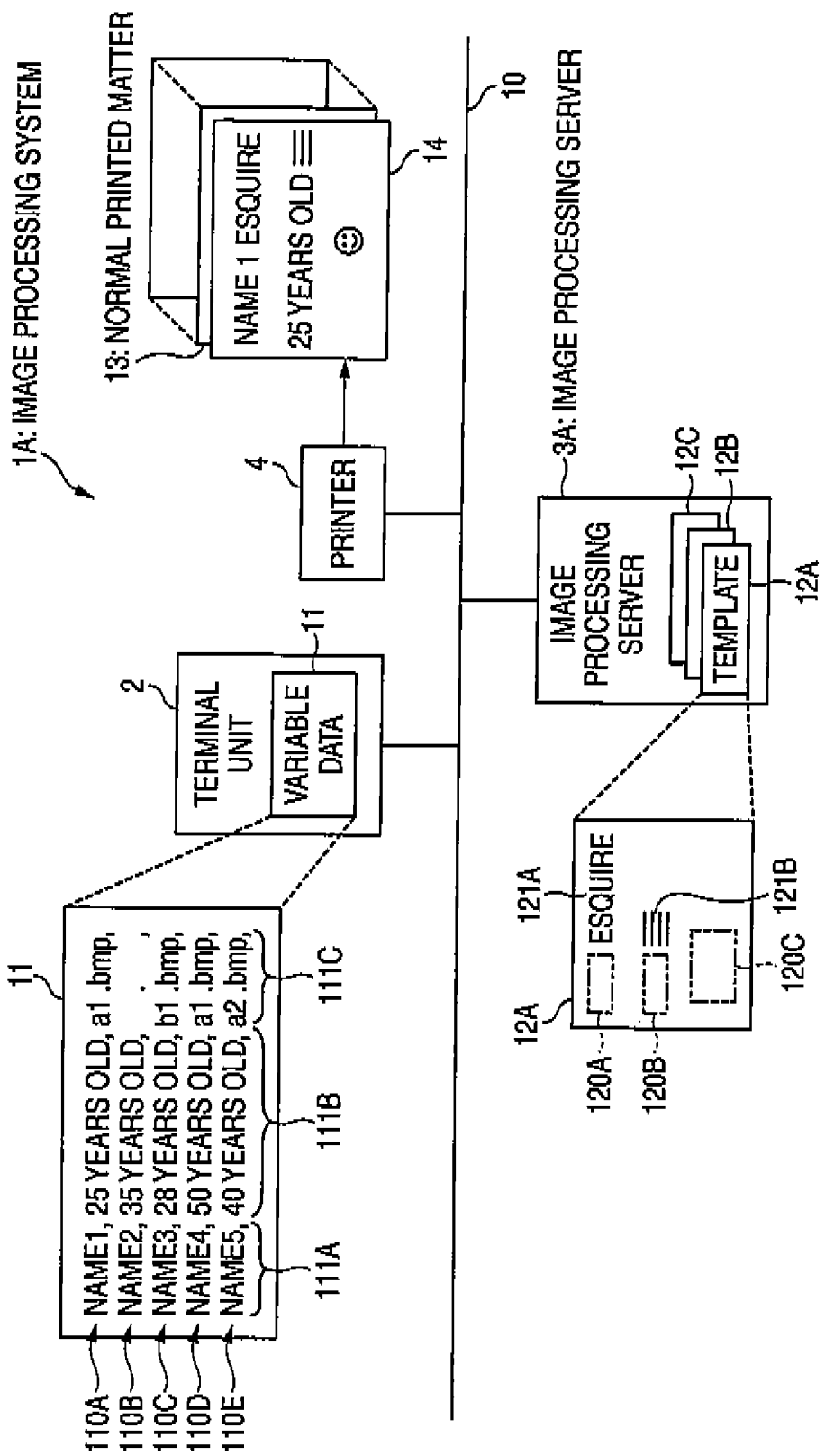
FIG. 1 is overall view showing an example of a schematic configuration of an image processing system according to a first embodiment of the invention.

FIG. 1 is an overall view showing an example of a schematic configuration of an image processing system according to a first embodiment of the invention. This image processing system 1A is made up of a terminal unit 2 for creating variable data 11, an image processing server 3A as an image processor for creating printing data (a variable image) based on the variable data 11 created by the terminal unit 2 and first to third templates 12A to 12C which constitute format definition data so as to output two printed matters (visualized images) for a normal output and an inspection output, a printer 4 as an output unit for printing a normal printed matter (a first visualized image) 13 and a printed matter for inspection or an inspection printed matter (a second visualized image) 14, and a network 10 for connecting the terminal unit 2, the image processing server 3A and the printer 4 to one another.

The network 10 is a communication network such as a LAN (local area network) and Internet where data transmission and reception of data is implemented through a wired communication (electric cables, optical cables and the like) and radio communication (radio waves, infrared rays and the like).

The variable data 11 is made up of a plurality of records 110A to 110E. Item data 111A to 111C such as, for example, name, address and the like whose contents vary record by record are recorded in the respective records 110A to 110E in such a state that the item data are broken by delimiters such as commas.

The first template 12A is configured by including a plurality of definitions such as definitions of variable fields 120A to 120C in which the respective item data 111A to 111C of the variable data are embedded and definitions of fixed portions 121A, 121B which are not dependent on the variable data 11.

The definitions of the variable fields 120A to 120C include, for example, a position and size of an area in the first template 12A, an output format specifying a color and font which are used when outputting the variable data with the item data embedded therein and associating information which specifies the variable field in the variable fields 120A to 120C in which the item data 111A to 111C are embedded. In addition, the definitions of the fixed portions 121A to 121B include, for example, a position and size of an area, an output format and specifying information which specifies a character string or an image which is to be displayed on the fixed portions.

In addition, template names intrinsic to the respective templates are added to the first template 12A and the template names so added are controlled by the image processing server 3A. Note that the second and third templates 12B, 12C are configured in the same manner as the first template 12A.

The normal printed matter 13 is a printed matter which is printed by the printer 4 based on printing data created by the image processing server 3A for normal output. In addition, the inspection printed matter 14 is a printed matter printed by the printer 4 based on printing data created for inspection output. In addition, the normal printed matter 13 and the inspection printed matter 14 may be printed in different output formats or the same output format.

In addition, in this embodiment, the image processing server 3A is such as to create normal output printing data for printing a normal printed matter 13 and inspection output printing data for printing an inspection printed matter 14 as separate printing data. However, any configuration may be adopted, provided that the normal printedmatter 13 and the inspection printedmatter 14 can be printed. For example, a configuration may be adopted in which single printing data is created, so that the single printing data so created is transmitted to the printer 4 twice or copy number information which instructs the printer 4 to print the printed matter two copies is added to the single printing data for transmission to the printer 4. In addition, a configuration may be adopted in which printing data is made to have a layer construction and single printing data is created which has a layer corresponding to the normal printed matter 13 and a layer corresponding to the inspection printed matter 14, so that the normal printed matter 13 and the inspection printed matter 14 are printed by switching the layers to be printed on the printer which receives the single printing data.

(Terminal Unit)

The terminal unit 2 is made up of a control part for controlling respective parts of the terminal unit 2 which is realized by, for example, a CPU or the like, a storage part for storing a program for editing the variable data 11, data and the like which is realized by, for example, ROM, RAM, hard disk or the like, a communication part which is realized by, for example, a network interface card or the like, and a display part for displaying various types of screens which is realized by, for example, a liquid crystal display or the like.

The terminal unit 2 can be made up of, for example, a computer, a personal digital assistant (PDA), or a mobile phone. Although FIG. 1 shows one terminal unit 2, two or more terminal units 2 may be used.

(Printer)

The printer 4 is made up of a control part for controlling respect parts of the printer 4 which is realized by, for example, a CPU or the like, a printing part for forming a visualized image on a recording medium such as a sheet of paper based on the printing data sent from the image processing server 3A and a communication part connected to the network 10 which is realized by, for example, a network interface card.

The printing part can use various forming methods such as an electrophotographic method, an inkjet method, a thermal transfer method and the like.

In addition, in place of the printer 4, multifunction equipment may be used which has a plurality of functions such as copying, printing, facsimileing and the like.

(Image Processing Server)

Figure 2:
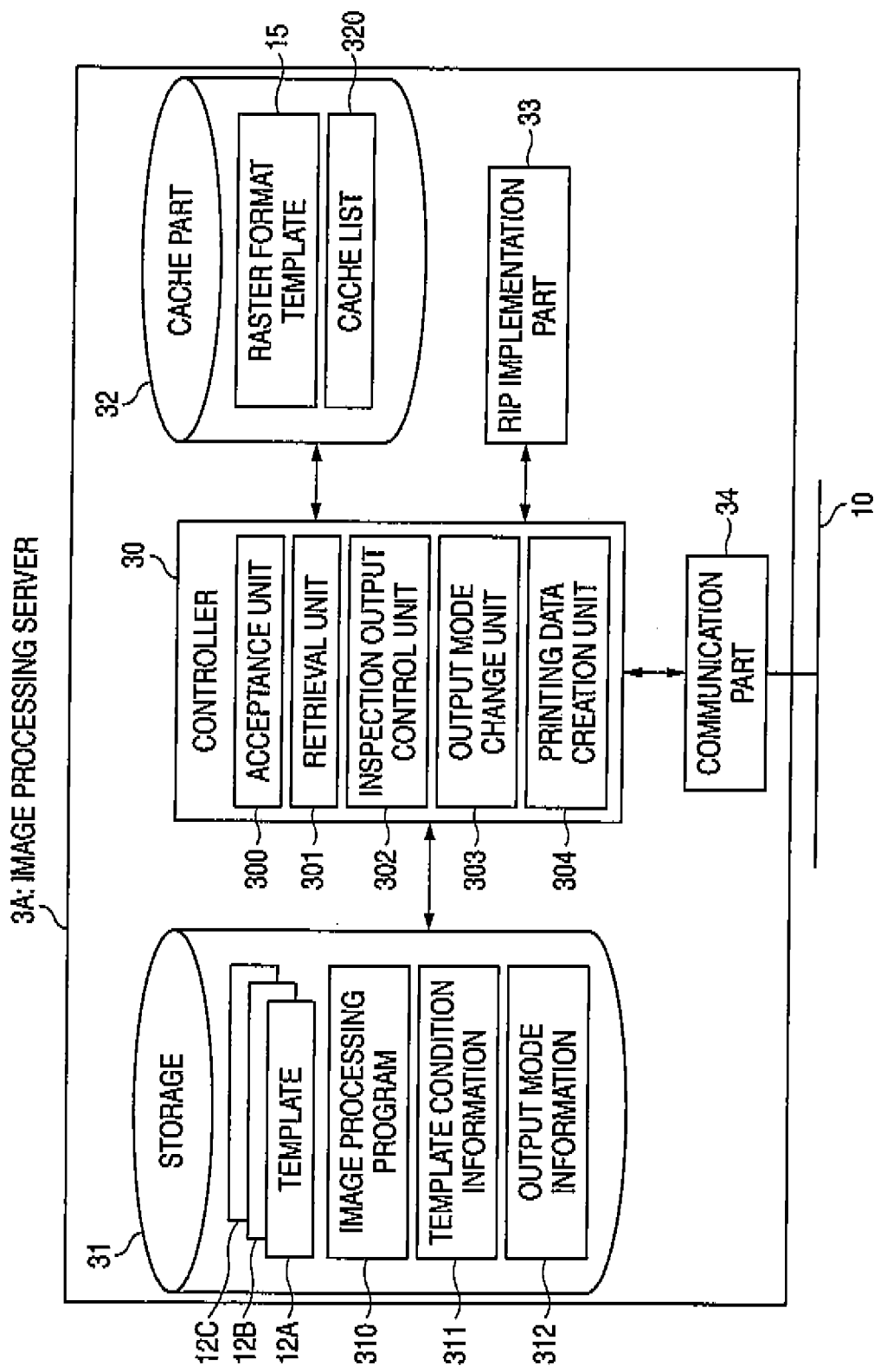
FIG. 2 is a block diagram showing an example of a schematic configuration of the image processing server according to the first embodiment of the invention.

FIG. 2 is a block diagram showing an example of a schematic configuration of the image processing server according to the first embodiment of the invention. This image processing server 3A is made up of a control part 30 for controlling respective parts of the image processing server 3A which is realized by, for example, a CPU or the like, a storage part (a first storage part) 31 for storing various type of programs and data which is realized by, for example, a hard disk or the like, a cache part (a second storage part) 32 having a faster reading speed than the control part 30 which is realized by, for example, a RAM or the like, a RIP implementation part (a rendering part) 33 for implementing an RIP (Raster Image Processor) operation for the respective templates 12A to 12C, and a communication part 34 connected to the network 10 which is realized by, for example, a network interface card.

The image processing server 3A described above can be made up of, for example, a computer, a server, a work station or the like.

Figure 7:
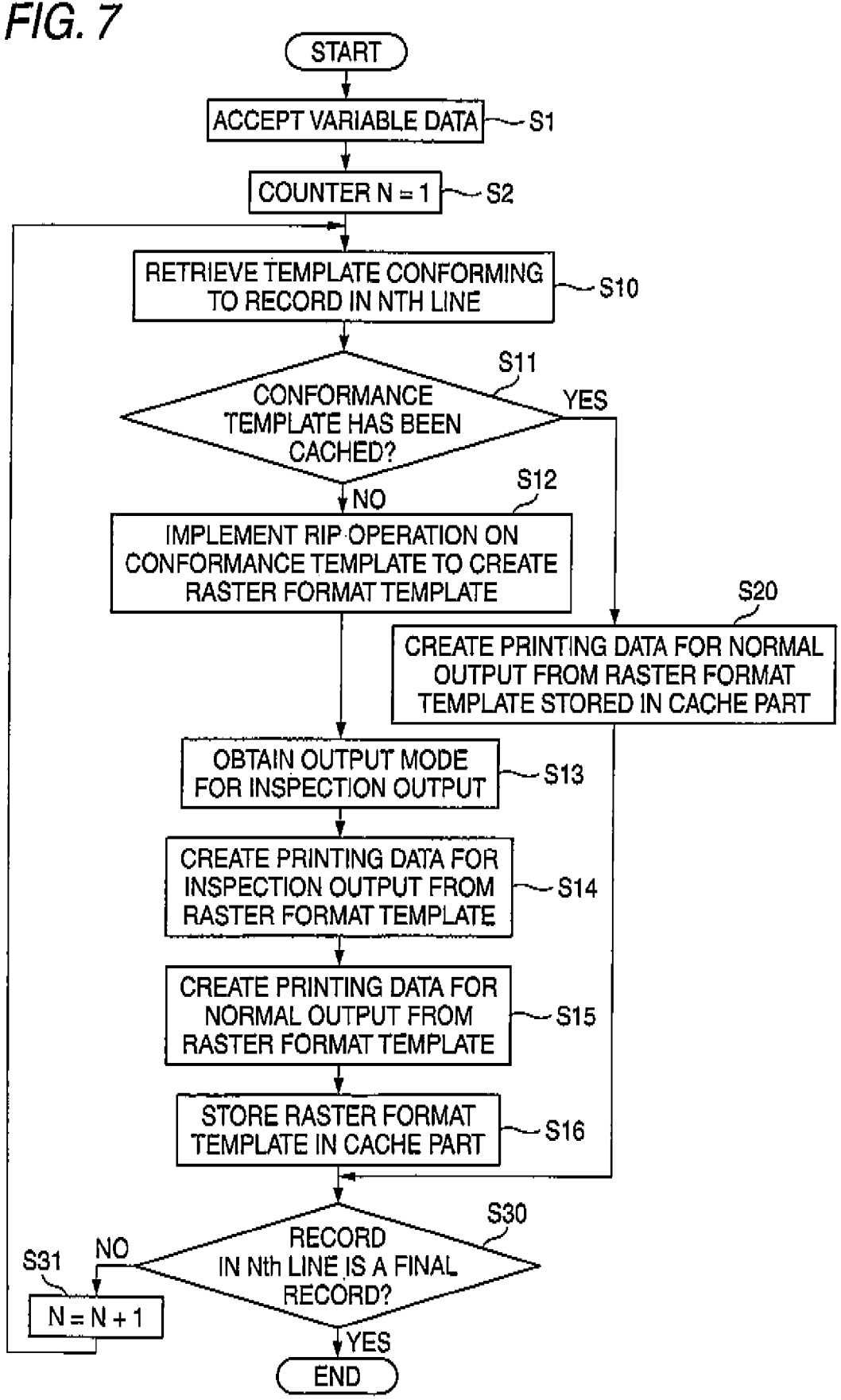
FIG. 7 is a flowchart showing an example of an operation of the image processing server.

The storage part 31 stores an image processing program 310 for executing respective steps shown in a flowchart, which will be described later, in FIG. 7, template condition information 311 and output mode information 312 in addition to the aforesaid first to third templates 12A to 12C. In these templates, program and information which are so stored, the first to third templates 12A to 12C, the template information 311 and the output format information 312 can be edited via the terminal unit 2.

The template condition information 311 stores conditions for retrieving the templates suitable for the records in the variable fields 120A to 120C by associating them with the respective templates. In addition, a specific example of the template condition information 311 will be described later.

The output mode information 312 determines output modes for the variable fields 120A to 120C in printing the inspection printed matter 14. As output modes, there are raised, for example, addition of frame lines for surrounding areas of the variable fields 120A to 120C by frame lines, addition of shades for use in filling the areas with predetermined patterns, change of fonts for item data which are to be embedded in the variable fields 120A to 120C and non-outputting in which the item data 111A to 111C are outputted in an invisible state. In addition, the output modes may be determined for the fixed portions 121A, 121B or may be determined for both the variable fields 120A to 120C and the fixed portion 121A, 121B.

The cache part 32 stores raster format templates (printing format data) 15, a cache list 320 and the like. The cache part 32 may only have to be a storage part for storing data temporarily, and the cache part 32 may be a cache memory incorporated in the CPU which realizes the control part 30 or a cache memory incorporated in the hard disk which realizes the storage part 31, and the cache part 32 does not have to be limited thereto.

The raster format templates 15 are data rendered in a raster format such as bitmap data which is created by the RIP operation being implemented for the respective templates 12A to 12C by the RIP implementation part 33.

The cache list 320 is a list of information which manages the raster format templates 15. In addition, the cache list 320 will be described in detail later.

The control part 30 operates according to the image processing program 310 and functions as an acceptance means 300, a retrieval means 301, an inspection output control means 302, an output mode change means 303, a printing data creation means 304 and the like. In addition, the retrieval means 301 and the inspection output control means 302 make up the control part according to the invention.

The acceptance means 300 accepts the variable data 11 sent from the terminal unit 2.

The retrieval means 301 analyzes the contents of the respective records 110A to 110E or item data 111A to 111C of the variable data 11 and retrieves templates suitable for the respective records 110A to 110E according to the template condition information 311 from the first to third templates 12A to 12C which are stored in the storage part 31. In addition, the retrieval means 301 may be made to retrieve templates suitable for the records based on, for example, the definitions of the variable fields 120A to 120C in the templates and the contents of the item data 111A to 111C without using the template condition information 311. Hereinafter, templates extracted as a result of retrieval by the retrieval means 301 will be referred to as conformance templates.

The inspection output control means 302 performs a first control to make the printing data creation means 304 not only create sequentially printing data corresponding to the respective records 110A to 110E of the variable data 11 but also output the printing data so created.

The inspection output control means 302 determines that an inspection output is implemented when the conformance templates are determined to be stored in the cache part 32 as a result of reference to the cache list 320, while the inspection output control means 302 determines that no inspection output is implemented when the conformance templates are determined not to be stored in the cache part 32.

In addition, when having determined that an inspection output is implemented, the inspection output control means 302 performs a second control to make the RIP implementation part 33 not only implement a rendering from the conformance templates to the raster format templates 15 but also output printing data in which the records are embedded in the raster format templates 15 which are rendered by the RIP implementation part 33 separately from the output of the printing data by the first control.

The output mode change means 303 obtains an output mode for inspection output from the output mode information 312 to change the output mode used when the printing data creation means 304 creates printing data for inspection output.

When creating printing data for inspection output, the printing data creating means 304 creates printing data by embedding the item data 111A to 111C which are contained in the records to be processed in the raster format templates 15 created by implementing the RIP operations on the conformance templates by the RIP implementation part 33 in such a state that the RIP operations are implemented separately by the RIP implementation part 33.

In addition, when creating printing data for normal output, since the raster format templates 15 corresponding to the conformance templates have already been created, the printing data creation means 304 creates printing data by embedding the item data 111A to 111C in the raster format templates 15 in the same manner as that described above. Because of this, a time to create the printing data for normal output is shortened by an amount by which the necessity of implementing the RIP operations on the conformance templates is obviated.

The RIP implementation part 33 implements the RIP operations in which the first to third templates 12A to 12C which are stored in the storage part 31 are rendered into the raster format so as to create raster format templates 15. In addition, the RIP implementation part 33 registers the raster format templates 15 so created in the cache part 32. In addition, as a method for managing the raster format templates 15, for example, a page description language such as a PostScript or a command to manage caches provided by an OS (Operating System) may be used. In addition, the RIP implementation part 33 may be realized either hardware or software.

Figure 3:
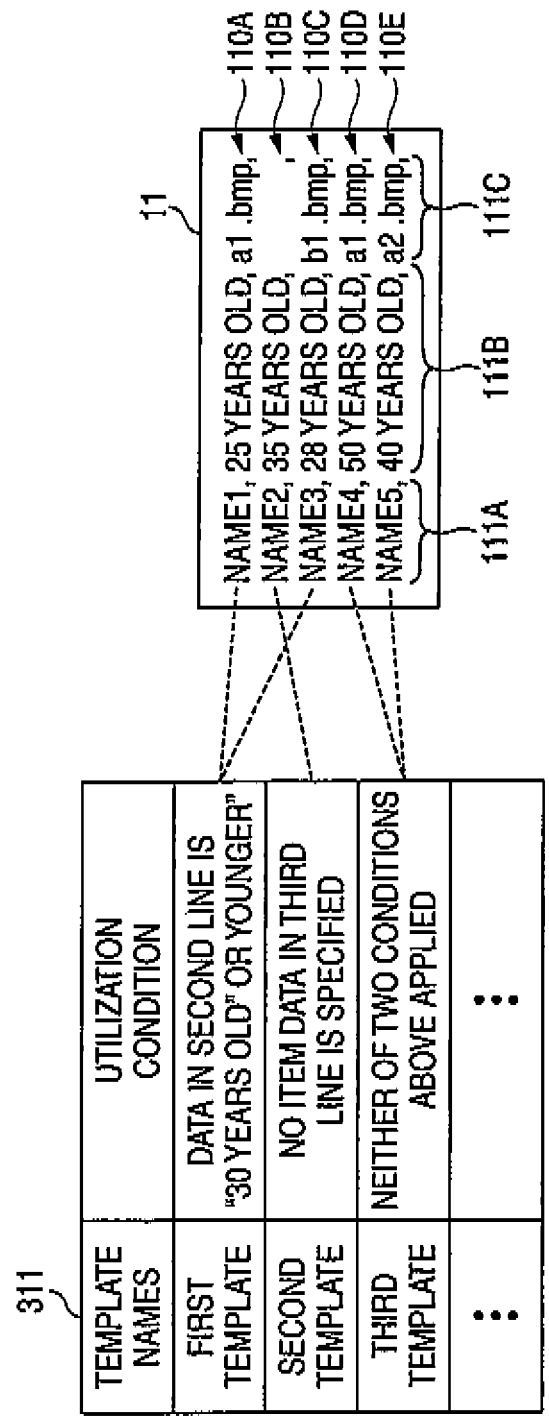
FIG. 3 is a diagram showing an example of template condition information.

FIG. 3 is a diagram depicting one example of template condition information. The template condition information 311 stored in the storage part 31 stores template names corresponding to first to third templates 12A to 12C and utilization conditions under which the templates 12A to 12C can be used.

The utilization conditions include a data existence condition of whether or not item data 111A to 111C are blank, a data content condition relating to the contents of the item data 111A to 111C and the like. In addition, one condition may be provided in relation to a plurality of item data or a plurality of conditions may be provided for single item data.

In the example shown in FIG. 3, the first template 12A is extracted by the retrieval means 301 as a conformance template which conforms to the utilization condition for records 110A, 110C in first and third lines of variable data 11. In addition, the second template 12B is extracted as a conformance template for a record 11B in a second line, and the third template 12C is extracted as a conformance template for records 110D, 110E in fourth and fifth lines of the variable data 11.

Figure 4:
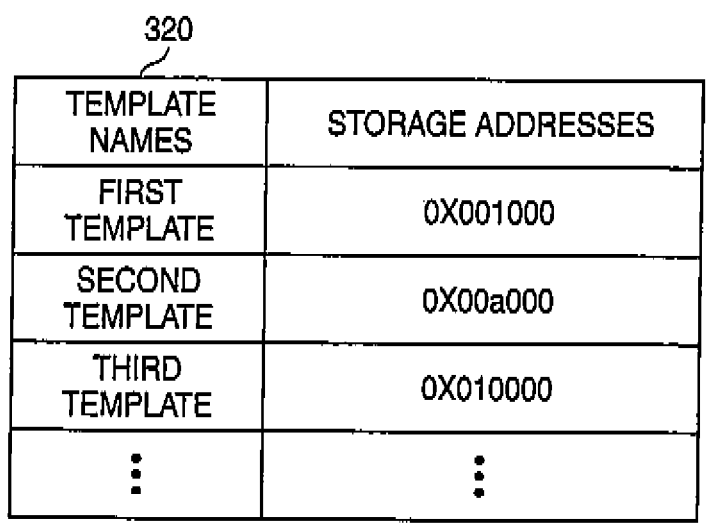
FIG. 4 is a diagram showing an example of a cache list.

FIG. 4 is a diagram showing an example of a cache list. In the cache list 320 which is stored in the cache part 32, template names of the raster format templates 15 and storage addresses are registered. The template names are used to manage the raster format templates 15 which are stored in the cache part 32, and the storage addresses are used to denote storage sites of the raster format templates 15 in the cache part 32.

In registration of fresh raster format templates 15 in the cache list 320 by the RIP implementation part 33, when there is no available vacancy in a storage capacity of the cache part 32, for example, the raster format templates 15 registered in the cache part 32 are sequentially deleted therefrom in the order in which they were registered in the cache part 32, and thereafter, the fresh raster format templates 15 are registered.

(Operation of First Embodiment)

Next, an example of an operation of the image processing system 1A according to the first embodiment of the invention will be described in accordance with a flowchart shown in FIG. 7 by reference to FIGS. 5 and 6.

Firstly, the print instructing person controls an input part of the terminal unit 2 to instruct printing based on the variable data 11. Then, the control part of the terminal unit 2 reads out the variable data from the storage part and transmit it to the image processing server 3A via the network 10.

The acceptance means 300 of the image processing server 3A accepts the variable data 11 transmitted from the terminal unit 2 to the image processing server 3A via the communication part 34 (S1). Next, the control part 30 initializes a counter N which indicates records to be processed to "1" in order to process record by record the respective records 110A to 110E which are contained in the variable data 11 (S2).

Next, the retrieval means 301 retrieves from the first to third templates 12A to 12C which are stored in the storage part 31 the template 12 which conforms to a record in an Nth line which the counter N indicates as a conformance template in accordance with the utilization condition of the template condition information 311 (S10).

Following this, the inspection output control means 302 determines whether or not the conformance template has been stored in the cache art 32 or has been cached by reference to the cache list 320 (S11).

In addition, if it determines that the conformance template has not yet been cached (S11: No), the inspection output control means 302 determines that an inspection output is implemented on the record in the Nth line and notifies the RIP implementation part 33 and the printing data creation means 304 of a decision to create printing data for inspection output and normal output.

When receiving the notice, the RIP implementation part 33 implements an RIP operation on the conformance template to create a raster format template (S12) and sends the raster format template so created to the printing data creation means 304.

Next, the output mode change means 303 obtains an output mode for inspection output from the output mode information 312 (S13).

Next, the printing data creation means 304 embeds respective item data 111A to 111C of the record in the Nth line in respective variable fields 120A to 120C of the raster format template created by the RIP implementation part 33 in the step S12. Then, the printing data creation means 304 changes an output mode for the variable fields 120A to 120C to the output mode obtained by the output mode change means 303 in the step S13 to thereby create printing data for inspection output (S14).

Next, the printing data creation means 304 changes the output mode for the variable fields 120A to 120C to an output mode predetermined for the conformance template to thereby create printing data for normal output (S15). An operation to embed the respective item data 111A to 111C in the respective variable fields 120A to 120C of the raster format template created is similar to the one used in creating the printing data for inspection output.

Then, the RIP implementation part 333 stores the raster format template 15 in the cache part 32 and registers the address and template name of the raster format template 15 in the cache list 320 while associating them with each other (S16).

On the other hand, if the inspection output control means 302 determines in step S11 that the conformance template has already been cached (S11: Yes), the inspection output control means 302 determines that no inspection output is implemented and notifies the printing data creation means 304 of creation of printing data for normal output.

Next, when receiving the notice, the printing data creation means 304 reads out the raster format template 15 which corresponds to the conformance template stored in the cache part 32. Then, the printing data creation means 304 embeds the respective item data 111A to 111C of the record in the Nth line in respective variable fields 120A to 120C of the raster format template 15 so read out to thereby create printing data for normal output (S20).

When the steps S16, S20 have ended, the control part 30 determines whether or not the record in the Nth line is a final record (S30). If the control part 30 determines that the record in the Nth line is not a final record (S30: No), the counter N is incremented (S31), and the operation returns to step S10. In contrast, if the record in the Nth line is determined to be a final record (S30: Yes), the control part 30 ends the operation on the variable data 11.

Next, the control part 30 transmits the printing data for inspection output and normal output which are created by the printing data creation means 304 to the printer 4 by the communication part 34 via the network 10. Note that the control unit 30 may be made to transmit the printing data for inspection output and normal output to the printer 4 sequentially or may be made to transmit the plurality of printing data to the printer altogether at one time.

Then, the control part of the printer 4 receives the printing data for inspection output and normal output from the image processing server 3A and prints sequentially an inspection printed matter and a normal printed matter based on the printing data by the printing part. The inspecting person visualizes the inspection printed matter so printed and inspects on external appearances of the printed matters in such a state that the item data are embedded in the conformance template from the aesthetic point of view. Although the printed matters are such as to be printed by the use of the conformance template, the inspecting person inspects whether or not the conformance template is appropriate to the item data so printed.

Thus, the inspection printed matter and the normal printed matter are printed for the template that is used for the first time for the variable data 11. In addition, in the event that an inspection printed matter and a normal printed matter are printed for the same record by highlighting, both the printed matters can easily be discriminated from each other, and inspecting portions on the inspection printed matter can easily be identified.

(Output Example of Printed Matters)

Figure 5:
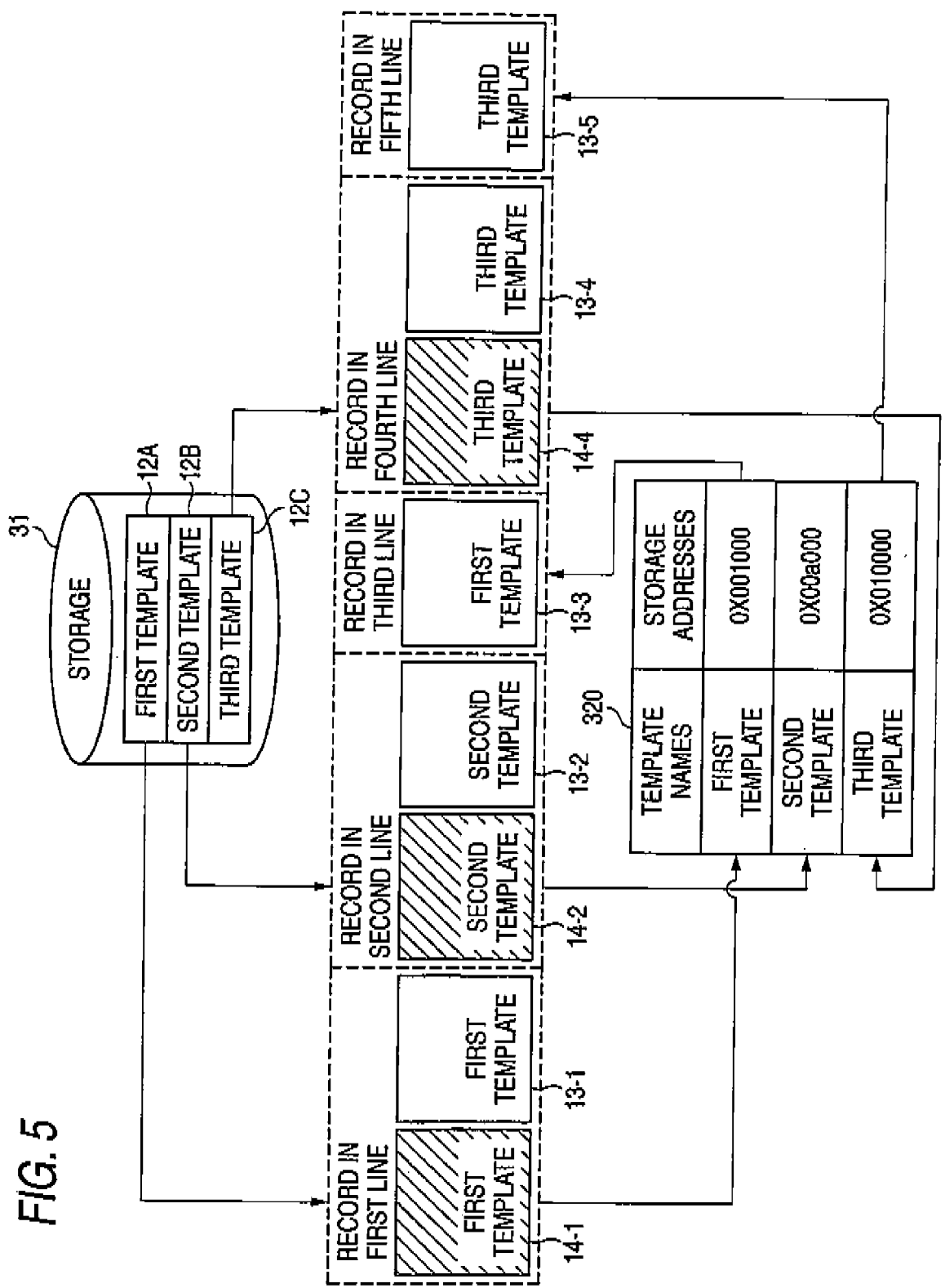
FIG. 5 is a diagram showing an example of a plurality of printed matters which are printed by a printer.

FIG. 5 is a diagram showing an example of a plurality of printed matters which are printed by the printer 4. These printed matters are such as to be printed when conformance templates are extracted for five records 110A to 110E which are contained in the variable data 11 as is shown in FIG. 3. In addition, FIG. 5 shows a printing order in which printing is started from a state in which no template is registered in the cache list 320 and then proceeds from the left to right in FIG. 5.

The order of records of the plurality of printed matters will be described. A first template 12A is extracted by the retrieval means 301 as a conformance template for a record 110A in a first line of the variable data 11. Since the first template 12A has not yet been cached at the point in time at which it is so extracted, the inspection output control means 302 determines that an inspection output is implemented, and an inspection printed matter 14-1 and a normal output printed matter 13-1 are printed. Then, a raster format template in which a RIP operation has been implemented on the first template 12A is registered in the cache list 320.

Next, a second template 12B is extracted as a conformance template for a record 110B in a second line. Since the second template 12B has not yet been cached as with the first template 12A, the inspection output control means 302 determines that an inspection output is implemented, whereby an inspection printed matter 14-2 and a normal printed matter 13-2 are printed. Then, a raster format template in which a RIB operation has been implemented on the second template 12B is registered in the cache list 320.

Next, although the first template 12A is extracted as a conformance template for a record 110C in a third line, since the first template 12A was cached when the first record 110A was processed, the inspection output control means 302 determines that no inspection output is implemented, and only a normal printed matter 13-3 is printed.

Next, a third template 12C is extracted as a conformance template for a record HOD in a fourth line. Since the third template 12C has not yet been cached, the inspection output control means 302 determines that an inspection output is implemented, whereby an inspection printed matter 14-4 and a normal printed matter 13-4 are printed. Then, a raster format template in which a RIB operation has been implemented on the third template 12C is registered in the cache list 320.

In addition, the third template 12C is extracted as a conformance template for a record 110E in a fifth line, and since the third template 12C has already been cached, the inspection output control means 302 determines that no inspection output is implemented, and only a normal printed matter 13-5 is printed.

In addition, while of the two printed matters which are printed when the inspection output is implemented, the first printed matter is made to constitute the inspection printed matter, the second printed matter may be made to constitute the inspection printed matter. Additionally, the printing order may be changed, for example, in such a way that the inspection printed matters 14-1, 14-2 and 14-3 are printed first and thereafter the normal printed matters 13-1 to 13-5 are printed.

(Specific Example of Output Modes)

Figure 6B:
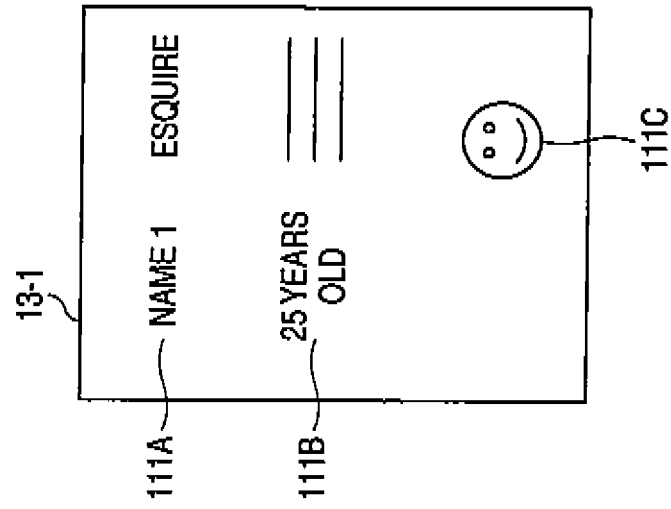
FIG. 6B shows an example of a normal printed matter.
Figure 6A:
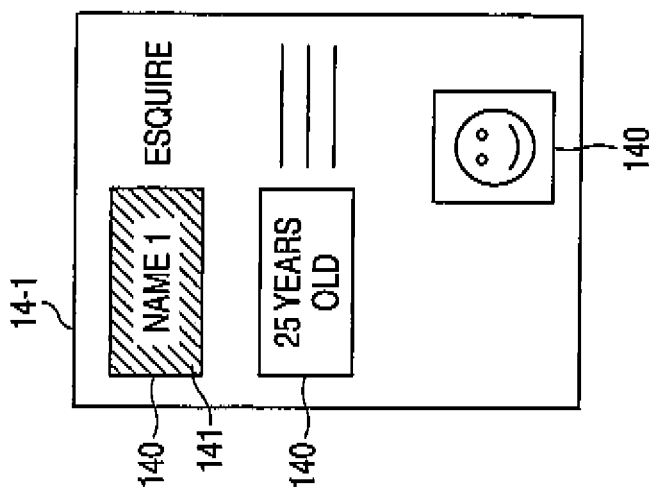
FIG. 6A shows an example of an inspection printed matter.

FIGS. 6(a) and 6(b) are diagrams showing an example of an inspection printed matter and a normal printed matter. These inspection printed matter 14-1 and normal printed matter 13-1 are the printed matters which were printed for the record in the first line in FIG. 5.

The inspection printed matter 14-1 depicted in FIG. 6A is printed in such a state that highlighting in the form of a frame line 140 and a shade 141 is given to the item data 111A to 111C by the output mode based on the output mode information 312.

Being different from the inspection printed matter 14-4, the normal printed matter 13-1 depicted in FIG. 6B is printed in such a state that no such highlighting is given to the item data 111A to 111C by the output mode which is predetermined for the conformance template.

(Modified Example)

In FIG. 5, while the one template is extracted as the conformance template for the respective records of the variable data 11, a case will be described below by reference to FIG. 8 in which a plurality of templates are extracted as conformance templates for each record.

Figure 8:
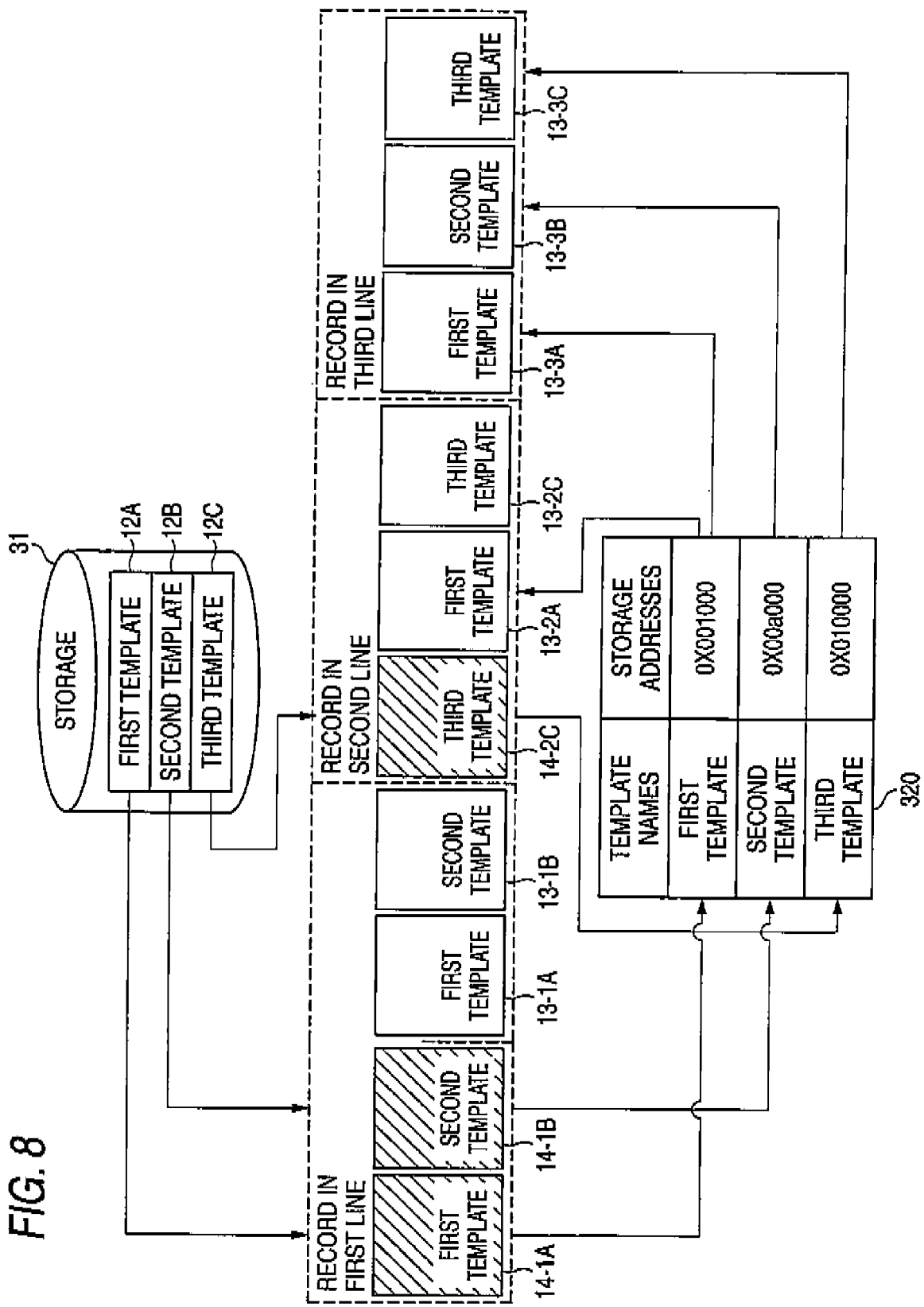
FIG. 8 is a diagram showing an example of a plurality of printed matters which are printed by a plurality of templates being retrieved for one record.

FIG. 8 is a diagram showing an example of a plurality of printed matters which are printed by a plurality of templates being retrieved for each record. In FIG. 8, a first and second templates 12A, 12B are extracted as conformance templates for a record in a first line, the first and third templates 12A, 12C are extracted as conformance templates for a record in a second line, and the first to third templates 12A to 12C are extracted as conformance templates for a record in a third line.

In a case like this, since the first and second templates 12A, 12B have not yet been cached for the first record 110A, two inspection printed matters 14-1A, 14-1B and two printed matters 13-1A, 13-1B are printed based on the first and second templates 12A, 12B. Then, a raster format template in which an RIB operation has been implemented on the first and second templates 12A, 12B is registered in the cache list 320.

Next, for the record 110B in the second line, since the first template 12A was cached when the first record was processed, one inspection printed matter 14-2C based on the third template 12C and two normal printed matters 13-2A, 13-2C based respectively on the first and third templates 12A, 12C are printed. Then, a raster format template in which an RIB operation has been implemented on the third template 12C is registered in the cache list 320.

In addition, for the third record 110C, since all the first to third templates 12A to 12C have been cached, three normal printed matters 13-3A to 13-3C based respectively on the first to third templates 12A to 12C are printed.

(Second Embodiment)

Figure 9:
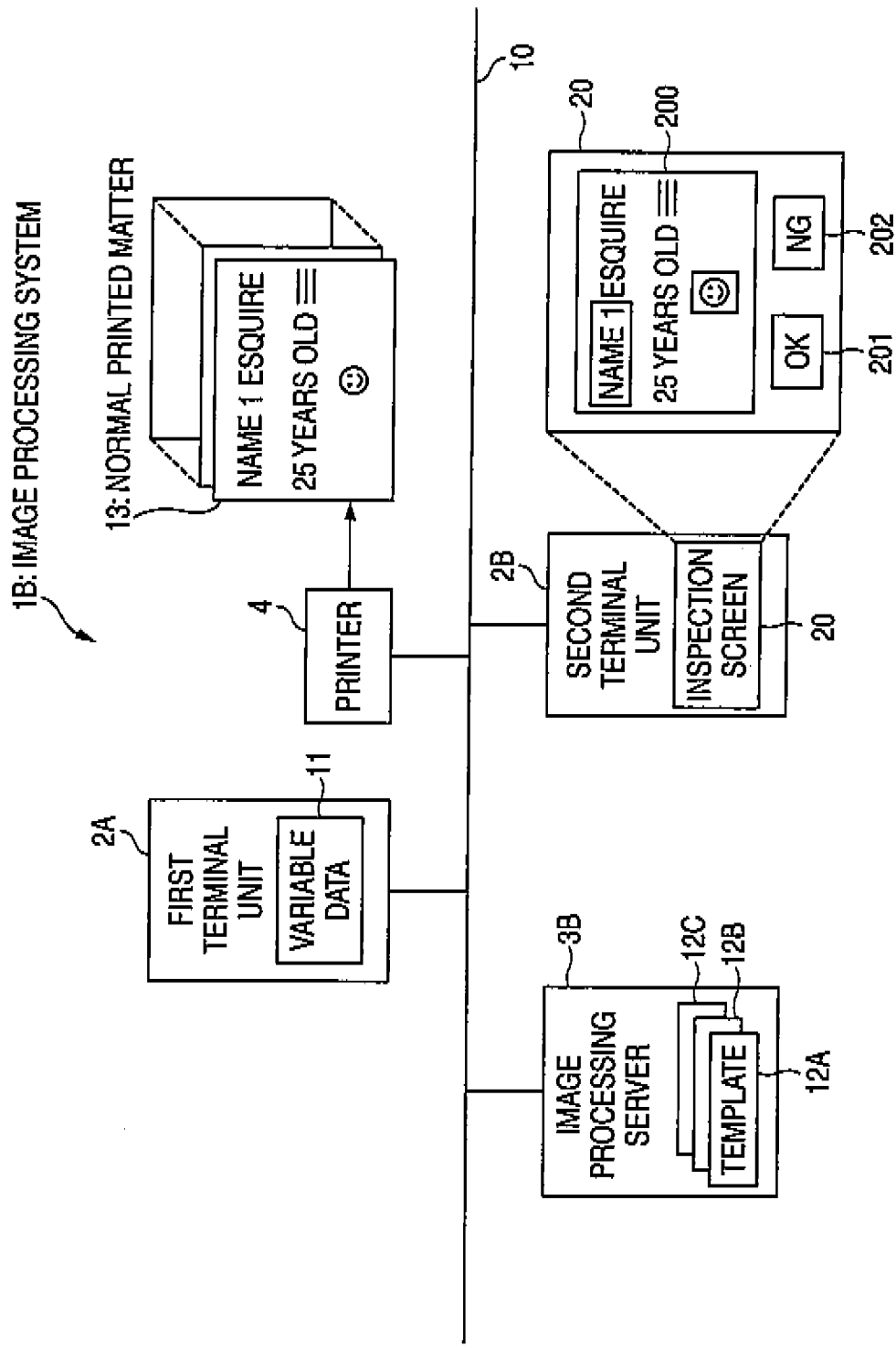
FIG. 9 is an overall view showing an example of a schematic configuration of an image processing system according to a second embodiment of the invention.

FIG. 9 is an overall view showing an example of a schematic configuration of an image processing system according to a second embodiment of the invention. This image processing system 1B is made up of an image processing server 3B for creating screen data (a variable image) for displaying an inspection screen (a second visualized image) 20 which corresponds to an inspection printed matter, a second terminal 2B as an output unit for displaying the inspection screen 20 based on the screen data created by the image processing server 3B, and a first terminal unit 2A, a printer 4 and a network 10 which are similar to those of the first embodiment.

The second terminal unit 2B is made up of, as with the first terminal unit 2A, a control part, a storage part, a communication part, an input part and a display part. For example, a web browser or the like for displaying the inspection screen 20 is stored in the storage part.

As with the image processing server 3A of the first embodiment, the image processing server 3B is made up of a control part, a storage part, a cache part, an RIP implementation part and a communication part.

The control part 30 functions as a screen data creation means for creating screen data for the inspection screen 20 and a printing data creation means for creating printing data for normal output. In addition, as with the control part of the first embodiment, the control part 30 also functions as an acceptance means, a retrieval means, an inspection output control means and an output mode change means.

The inspection screen 20 includes a display area 200 which corresponds to an inspection printed matter, an inspection OK button 201 which is disposed below the display area 200 so as to be depressed when the contents displayed on the display area 200 are determined as being appropriated by an inspecting person and an inspection NG button 202 which is disposed below the display area 200 so as to be depressed when the contents are determined as being inappropriate by the inspecting person. In addition, on the inspection screen 20 displayed, when either the inspection OK button 201 or the inspection NG button 202 is depressed by the inspecting person, inspection information corresponding to the button so depressed is transmitted from the second terminal unit 2B to the image processing server 3B.

In the event that the inspection information received thereby denotes that the "inspection is OK," the printing data creation means creates printing data for normal output, whereas in the event that the inspection information received thereby denotes that the "inspection is no good or NG," the printing data creation means creates no printing data for normal output and sends a notices denoting that the "inspection is no good or NG" to the first terminal unit 2A.

Since the inspection screen 20 is displayed on the second terminal unit 2B in the way described above, inspection work can be performed in a different site from the side where the printer is installed.

(Other Embodiments)

In addition, the invention is not limited to the respective embodiments that have been described heretofore but may be modified variously without departing from the spirit and scope thereof. For example, in the respective embodiments, while the respective means that are possessed by the image processing server are realized by the control part and the control program, part or all of the means may be realized by hardware.

In addition, the programs used in the respective embodiments may be read into the storage part within the system from a recording medium such as a CD-ROM or the like.

Additionally, the image processing system in the respective embodiments may only have to include the functions and data that are possessed by the image processing server as the whole image processing system, and the image processing system may be realized by two or more devices or part of the functions and data may be provided on the terminal unit or the printer.

In addition, the constituent elements of the respective embodiments may be combined arbitrarily without departing from the spirit and scope of the invention.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image processor comprising:
a storage unit that comprises a first part and a second part, the first part storing a plurality of templates for variable images to be created based on records constituting variable data;
a rendering unit that renders a first template for a first variable image to be created based on a first record constituting variable data, and generates a first rendered template and stores the first rendered template to the second part;
a receiving unit that receives a second record constituting variable data;
a determining unit that determines if a second template to be used for creating a second variable image is equal to the first template that has been rendered by the rendering unit;
a control unit that controls, based on a result of the determining, whether to output (1) both of the second variable image and an inspection image of the second variable image, or (2) the second variable image only;
a retrieval unit that retrieves, from the first part, the second template as suitable for the second variable image according to at least one of (1) definition of the second variable data, (2) contents of the second variable data, and (3) a template condition information,
wherein a portion of at least one of the records arranged in the inspection image is highlighted as compared to the second variable image.

2. The image processor as claimed in claim 1, wherein the inspection image is output differently than the second variable image.

3. An image processing system comprising:
an image processor including:
a storage unit that comprises a first part and a second part, the first part storing a plurality of templates for variable images to be created based on records constituting variable data;
a rendering unit that renders a first template for a first variable image to be created based on a first record constituting variable data, and generates a first rendered template and stores the first rendered template to the second part;
a receiving unit that receives a second record constituting variable data;
a determining unit that determines if a second template to be used for creating a second variable image is equal to the first template that has been rendered by the rendering unit;
a control unit controls, based on a result of the determining, whether to output (1) both of the second variable image and an inspection image of the second variable image, or (2) the second variable image only;
a retrieval unit that retrieves, from the first part, the second template as suitable for the second variable image according to at least one of (1) definition of the second variable data, (2) contents of the second variable data, and (3) a template condition information,
wherein a portion of at least one of the records arranged in the inspection image is highlighted as compared to the second variable image.

4. The image processor as claimed in claim 1, wherein the second variable image in output in a different mode than the inspection image.

5. The image processor as claimed in claim 4, wherein the second variable image is printed by a printer and the inspection image is displayed on a video display.

6. An image processing method comprising:
storing, in a storage unit comprising a first part and a second part, a plurality of templates for variable images to be created based on records constituting variable data in the first part;
rendering a first template for a first variable image to be created based on a first record constituting variable data and generating a first rendered template and storing the first rendered template in the second part;
receiving a second record constituting variable data;
determining if a second template to be used for creating a second variable image is equal to the first rendered template;
controlling, based on a result of the determining, whether to output (1) both of the second variable image and an inspection image of the second variable image, or (2) the second variable image only; and
retrieving, from the first part, the second template as suitable for the second variable image according to at least one of (1) definition of the second variable data, (2) contents of the second variable data, and (3) a template condition information,
wherein a portion of at least one of the records arranged in the inspection image is highlighted as compared to the second variable image.

7. A non-transitory computer readable medium storing a program causing a computer to execute a process for performing image processing, the process comprising:
storing, in a storage unit comprising a first part and a second part, a plurality of templates for variable images to be created based on records constituting variable data in the first part
rendering a first template for a first variable image to be created based on a first record constituting variable data and generating a first rendered template and storing the first rendered template in the second part;
receiving a second record constituting variable data;
determining if a second template to be used for creating a second variable image is equal to the first rendered template;
controlling, based on a result of the determining, whether to output (1) both of the second variable image and an inspection image of the second variable image, or (2) the second variable image only; and
retrieving, from the first part, the second template as suitable for the second variable image according to at least one of (1) definition of the second variable data, (2) contents of the second variable data, and (3) a template condition information,
wherein a portion of at least one of the records arranged in the inspection image is highlighted as compared to the second variable image.

8. The image processor as claimed in claim 2, wherein a portion where at least one of the records is arranged in the inspection image is highlighted as compared to the second variable image output.

9. The image processor according to claim 1, wherein
if the control unit controls to output both of the second variable image and the inspection image, the control unit controls to output the second variable image and the inspection image continuously.

10. The image processor according to claim 1, wherein
if the retrieval unit retrieves the second template and a third template as suitable for the second variable image, the determining unit determines whether the second and third template are equal to the first template, and the controller controls to output the second variable images created using the second and third templates, and controls whether to output the second inspection image created using the second and the third templates based on a result of the determination.

* * * * *